United States Patent

Matsunaga

(10) Patent No.: US 8,783,213 B2
(45) Date of Patent: Jul. 22, 2014

(54) HEAT EXCHANGER AND WATER HEATER INCORPORATING THE SAME

(75) Inventor: Hironao Matsunaga, Hyogo (JP)

(73) Assignee: Noritz Corporation, Hyogo (JP)

( * ) Notice: Subject to any disclaimer, the term of this patent is extended or adjusted under 35 U.S.C. 154(b) by 717 days.

(21) Appl. No.: 12/926,967

(22) Filed: Dec. 21, 2010

(65) Prior Publication Data

US 2011/0155079 A1    Jun. 30, 2011

(30) Foreign Application Priority Data

Dec. 25, 2009  (JP) .................................. 2009-296243

(51) Int. Cl.
*F24H 1/12*         (2006.01)

(52) U.S. Cl.
USPC ...................... 122/31.1; 122/235.23; 122/249; 122/250 R

(58) Field of Classification Search
CPC ................ F24H 9/00; F24H 1/12; F28F 9/22; F23H 1/40; F23H 1/43
USPC ............... 122/15.1, 18.1, 32, 31.1, 33, 155.2, 122/140.1–140.2, 249, 250 R, 235.23; 165/150
See application file for complete search history.

(56) References Cited

U.S. PATENT DOCUMENTS

| | | | | |
|---|---|---|---|---|
| 1,828,870 A | * | 10/1931 | Lucke | 122/235.15 |
| 1,919,521 A | * | 7/1933 | Lasker | 122/235.19 |
| 1,924,850 A | * | 8/1933 | Freiday | 122/235.24 |
| 1,925,780 A | * | 9/1933 | Vanorio | 122/23 |
| 2,059,946 A | * | 11/1936 | Hartmann | 122/33 |
| 2,178,619 A | * | 11/1939 | Victor | 122/265 |
| 2,203,370 A | * | 6/1940 | Taylor | 122/140.1 |
| 2,221,871 A | * | 11/1940 | Kerr | 122/478 |
| 2,494,608 A | * | 1/1950 | Bumstead, Jr | 122/240.3 |
| 3,352,298 A | * | 11/1967 | Hope | 122/18.4 |
| 4,184,455 A | * | 1/1980 | Talmud et al. | 122/4 D |
| 4,320,869 A | * | 3/1982 | Ebert | 236/1 G |
| 5,775,267 A | * | 7/1998 | Hou et al. | 122/18.4 |
| 7,458,340 B2 | * | 12/2008 | Takeda et al. | 122/31.1 |
| 2007/0289559 A1 | * | 12/2007 | Amada | 122/19.2 |

FOREIGN PATENT DOCUMENTS

JP        2008-298325 A      12/2008

* cited by examiner

*Primary Examiner* — Steven B McAllister
*Assistant Examiner* — Ko-Wei Lin
(74) *Attorney, Agent, or Firm* — Rader, Fishman & Grauer PLLC

(57) ABSTRACT

A heat exchanger A1 includes: a case 2 surrounding a heat transfer tube 4; and a guide member 5 for guiding heating gas entering the case 2 through an intake vent 21 to a first space region 24A and then to a second space region 24B, the guide member 5, together with a wall portion 20b, defining therebetween a gap 25b in communication with a gap 25a between the wall portion 20b and the heat transfer tube 4 for allowing part of the heating gas having been guided to the first space region 24A to proceed into the second space region 24B through the gaps 25a and 25b. This arrangement performs efficient heat recovery from the heating gas by effectively utilizing the entire heat transfer tube 4 while alleviating a problem that the case 2 is partially heated to elevated temperatures.

17 Claims, 11 Drawing Sheets

HEAT EXCHANGER AND WATER HEATER INCORPORATING THE SAME

BACKGROUND OF THE INVENTION

1. Field of the Invention

The present invention relates to a heat exchanger configured to perform heat exchange between heating gas, such as combustion gas, and a heat transfer tube, as well as a water heater incorporating the same.

2. Description of the Related Art

One example of a heat exchanger is described in Japanese Patent Laid-Open Publication No. 2008-298325. FIG. 14 illustrates this heat exchanger.

The heat exchanger B illustrated in FIG. 14 includes a case 9, a plurality of heat transfer tubes 8, and a guide member 7 located in a central space defined by the plurality of heat transfer tubes 8. The case 9 has a bottom wall portion 90a and a front wall portion 90b which are formed with an intake vent 91 and an exhaust vent 92 for taking in and exhausting combustion gas. The heat transfer tubes 8 are formed using spiral tubes and accommodated in the case 9. The guide member 7 has an opening 70 oriented in a rearward direction Rr. Combustion gas entering the guide member 7 through the intake vent 91 proceeds in the rearward direction Rr from the opening 70 and acts on a rear region 8A of the heat transfer tubes 8. Then, the combustion gas is reflected by a rear wall portion 90c of the case 9 and passes through gaps formed on opposite lateral sides of the guide member 7 (on the sides before and behind the guide member 7 in the figure) in a forward direction Fr. Thus, the combustion gas acts on a front region 8B of the heat transfer tubes 8. Thereafter, the combustion gas is exhausted out of the case 9 through the exhaust vent 92. This arrangement makes it possible to place the guide member 7 in the central space defined by the plurality of heat transfer tubes 8 with a high space efficiency as well as to cause the plurality of heat transfer tubes 8 to recover heat from the combustion gas.

The heat exchanger B described above, however, involves the following problems.

In the heat exchanger B, an upper portion of the guide member 7 is in contact with an upper wall portion 90d of the case 9 and, hence, no gap is provided between the guide member 7 and the upper wall portion 90d. Therefore, after the combustion gas has proceeded from the opening 70 of the guide member 7 toward the rear side within the case 7, the combustion gas does not so easily proceed toward a gap 93 between the rear region 8A of the heat transfer tubes 8 and the upper wall portion 90d. This means that the upper portion of the rear region 8A of the heat transfer tubes 8 is not sufficiently utilized in heat recovery from the combustion gas. This is not so preferable in increasing the heat recovery rate.

Further, the guide member 7 is heated to elevated temperatures by the combustion gas and the heat is transferred from the upper portion of the guide member 7 directly to the upper wall portion 90d of the case 9. Accordingly, the upper wall portion 90d is heated to considerably high temperatures. The upper wall portion 90d thus heated to such high temperatures dissipates heat in an increased amount to outside the case 9, thus resulting in an increased heat loss.

SUMMARY OF THE INVENTION

It is an object of the present invention to provide a heat exchanger capable of appropriately preventing or alleviating the above-described problems, as well as a water heater incorporating the same.

In order to solve the above-described problems, the present invention provides the following technical means.

According to a first aspect of the present invention, there is provided a heat exchanger comprising: a heat transfer tube for heat exchange; a case having a plurality of wall portions surrounding the heat transfer tube and formed with an intake vent and an exhaust vent for taking in and exhausting heating gas, the plurality of wall portions including a first wall portion formed with the intake vent, a second wall portion opposed to the first wall portion across the heat transfer tube and defining a first gap between the second wall portion and the heat transfer tube, and a third wall portion interconnecting the first and second wall portions, the case defining therein a first space region which is located closer to the third wall portion than a region formed with the intake vent and which accommodates therein at least part of the heat transfer tube, and a second space region which is located on a side opposed to the first space region across the region formed with the intake vent and which is in communication with the exhaust vent; and a guide member for guiding the heating gas entering the case through the intake vent to the first space region and then to the second space region. The guide member, together with the second wall portion, defines therebetween a second gap in communication with the first gap for allowing part of the heating gas having been guided to the first space region to proceed into the second space region through the first and second gaps.

Preferably, the heat exchanger has an arrangement wherein: in the first space region the heat transfer tube and the first wall portion define a third gap therebetween; and the guide member is positioned in such a manner as not to form a partition between the intake vent and the third gap, to allow part of the heating gas entering the case through the intake vent to proceed toward the third gap.

Preferably, the heat exchanger has an arrangement wherein: the heat transfer tube extends over both of the first and second space regions and has a neighbor portion which faces and neighbors the guide member in the second space region; and the guide member has a sloped portion which is inclined in such a manner that as the sloped portion extends away from the third wall portion, the sloped portion is spaced an increasing distance apart from the second wall portion and which causes part of the heating gas passing through the second gap from the first gap to proceed therealong toward the neighbor portion of the heat transfer tube.

Preferably, the heat exchanger has an arrangement wherein that portion of the guide member which faces the second wall portion across the second gap is opposed closely to or brought into contact with the heat transfer tube in the first space region in such a manner as to inhibit the heating gas impinging upon the guide member through the intake vent from partially flowing directly into the first and second gaps.

Preferably, the heat exchanger has an arrangement wherein: one of the first and second wall portions is a bottom wall portion which is located below the heat transfer tube and serves to receive drain dropped from the heat transfer tube; and the case is provided with drain discharging means for discharging the drain out of the case, while the bottom wall portion is inclined at least partially to cause the drain to flow toward the drain discharging means.

Preferably, the heat exchanger has an arrangement wherein: the first wall portion is the bottom wall portion; the intake vent has a peripheral edge portion formed with an erected wall for preventing the drain from flowing into the intake vent; and the guide member has a lower portion which, together with the bottom wall portion, defines a fourth gap therebetween for preventing the flow of the drain toward the drain discharging means from being dammed up by the lower portion of the guide member.

Preferably, the heat exchanger has an arrangement wherein the lower portion of the guide member is positioned to keep out of a region immediately above the intake vent and fail to contact the erected wall, whereby when drain adhering to the guide member flows downwardly along the guide member, the drain is prevented from flowing into the intake vent.

Preferably, the heat exchanger has an arrangement wherein the lower portion of the guide member and the erected wall overlap each other in a horizontal direction to inhibit the heating gas proceeding from the first space region toward the second space region from partially passing through a gap between the lower portion of the guide member and the erected wall.

Preferably, the heat exchanger has an arrangement wherein: the case further includes a fourth wall portion erected from the bottom wall portion and formed with the exhaust vent; and the fourth wall portion has an outer surface fitted with an exhaust terminal which guides exhaust combustion gas passing through the exhaust vent while defining a drain outlet for discharging drain flowing into the exhaust terminal to outside, whereby the drain dropped onto the bottom wall portion is allowed to flow into the exhaust terminal through the exhaust vent and then caused to be discharged to outside through the drain outlet.

Preferably, the heat exchanger has an arrangement wherein: the bottom wall portion of the case has a portion forming a lower edge portion of the exhaust vent which is formed into a press-worked portion by being folded into plural plies and pressed flat; and the exhaust terminal is fitted on the fourth wall portion by utilizing the press-worked portion.

Preferably, the heat exchanger further comprises a partition wall partitioning the case into a first chamber and a second chamber, wherein: the intake vent is positioned to cause the heating gas to flow into the first chamber, while the heat transfer tube and the guide member are accommodated in the first chamber; and the case is provided with an additional intake vent for allowing heating gas to flow into the second chamber, while the second chamber is provided with an additional heat transfer tube for heat recovery from the heating gas flowing into the second chamber.

Preferably, the heat exchanger has an arrangement wherein: one of the first and second wall portions is a bottom wall portion and the other is an upper wall portion, while the third wall portion is a rear wall portion; and the case further includes a fourth wall portion which is erected from the bottom wall portion and formed with the exhaust vent, the fourth wall portion being a front wall portion, the exhaust vent allowing the heating gas finished with heat recovery to be exhausted forwardly from the case therethrough.

Preferably, the heat exchanger has an arrangement wherein: one of the first and second wall portions is a bottom wall portion and the other is an upper wall portion, while the third wall portion is a front wall portion; and the case further includes a fourth wall portion which is erected from the bottom wall portion and formed with the exhaust vent, the fourth wall portion being a rear wall portion, the exhaust vent allowing the heating gas finished with heat recovery to be exhausted rearwardly from the case therethrough.

Preferably, the heat exchanger has an arrangement wherein the first wall portion and the second wall portion are a bottom wall portion and an upper wall portion, respectively, while the exhaust vent is located at the upper wall portion to allow the heating gas finished with heat recovery to be exhausted upwardly from the case therethrough.

Preferably, the heat exchanger has an arrangement wherein the first wall portion and the second wall portion are an upper wall portion and a bottom wall portion, respectively, while the intake vent is capable of being supplied with the heating gas from above the case.

Preferably, the heat exchanger has an arrangement wherein the heat transfer tube is one of an ovally spiral tube, a straight tube, and a meandering tube.

According to a second aspect of the present invention, there is provided a water heater comprising: means for supplying heating gas; and a heat exchanger configured to heat water by heat recovery from the heating gas. The heat exchanger comprises: a heat transfer tube for heat exchange; a case having a plurality of wall portions surrounding the heat transfer tube and formed with an intake vent and an exhaust vent for taking in and exhausting the heating gas, the plurality of wall portions including a first wall portion formed with the intake vent, a second wall portion opposed to the first wall portion across the heat transfer tube and defining a first gap between the second wall portion and the heat transfer tube, and a third wall portion interconnecting the first and second wall portions, the case defining therein a first space region which is located closer to the third wall portion than a region formed with the intake vent and which accommodates therein at least part of the heat transfer tube, and a second space region which is located on a side opposed to the first space region across the region formed with the intake vent and which is in communication with the exhaust vent; and a guide member for guiding the heating gas entering the case through the intake vent to the first space region and then to the second space region. The guide member, together with the second wall portion, defines therebetween a second gap in communication with the first gap for allowing part of the heating gas having been guided to the first space region to proceed into the second space region through the first and second gaps.

The foregoing and other features and advantages of the present invention will become apparent from the following detailed description of the invention made with reference to the attached drawings.

DETAILED DESCRIPTION OF THE PREFERRED EMBODIMENTS

Hereinafter, preferred embodiments of the present invention will be described specifically with reference to the drawings.

FIGS. 1 to 5 illustrate one exemplary water heater incorporating a heat exchanger according to the present invention.

Figure 3:
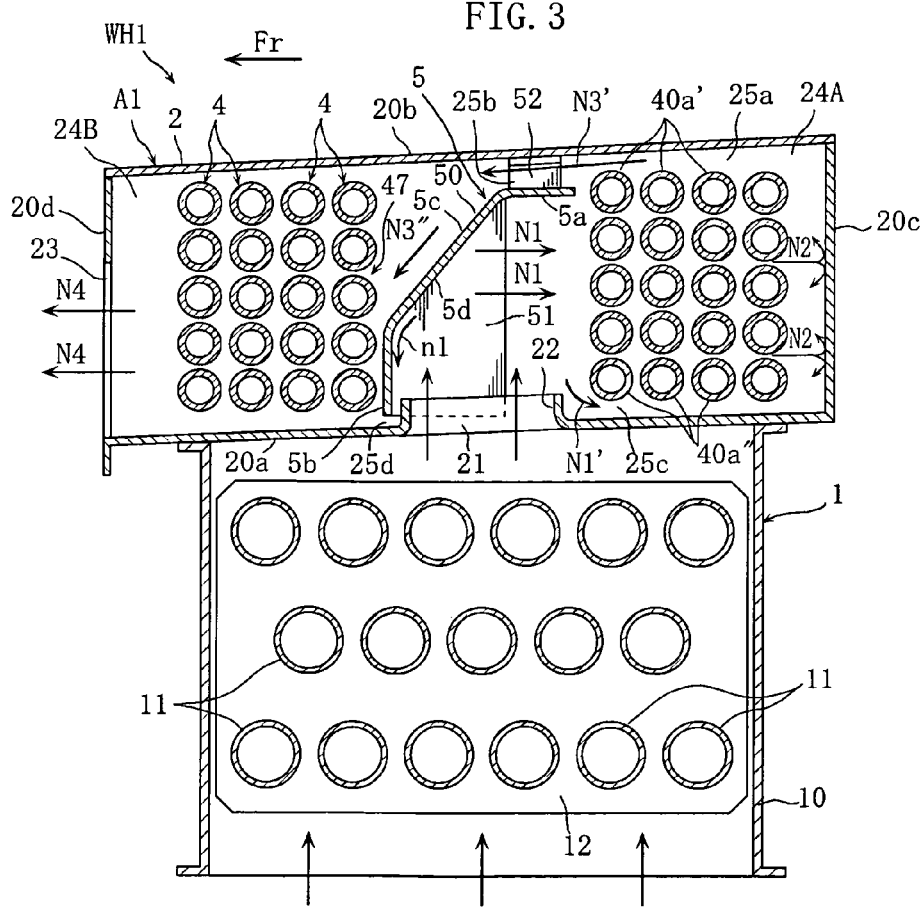
FIG. 3 is a sectional view, taken on line of FIG. 1, of the water heater.
Figure 4:
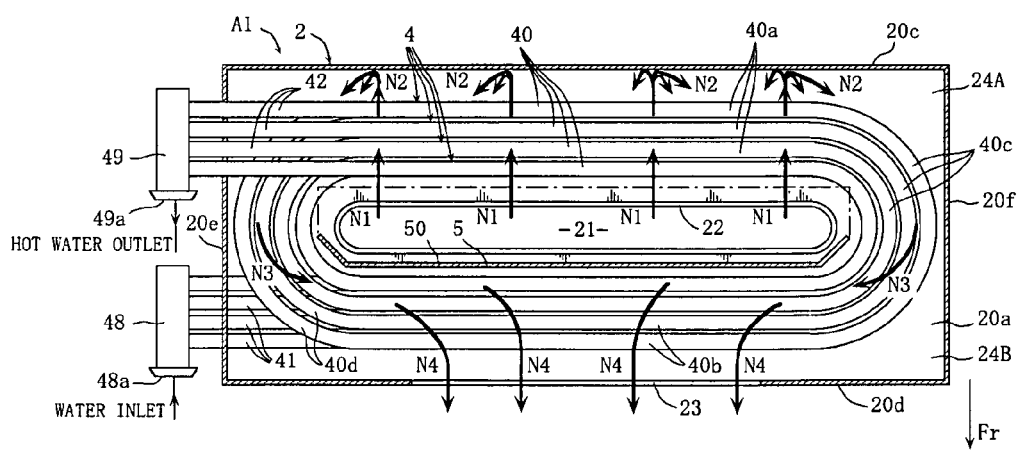
FIG. 4 is a sectional plan view of the heat exchanger shown in FIG. 1.
Figure 5:
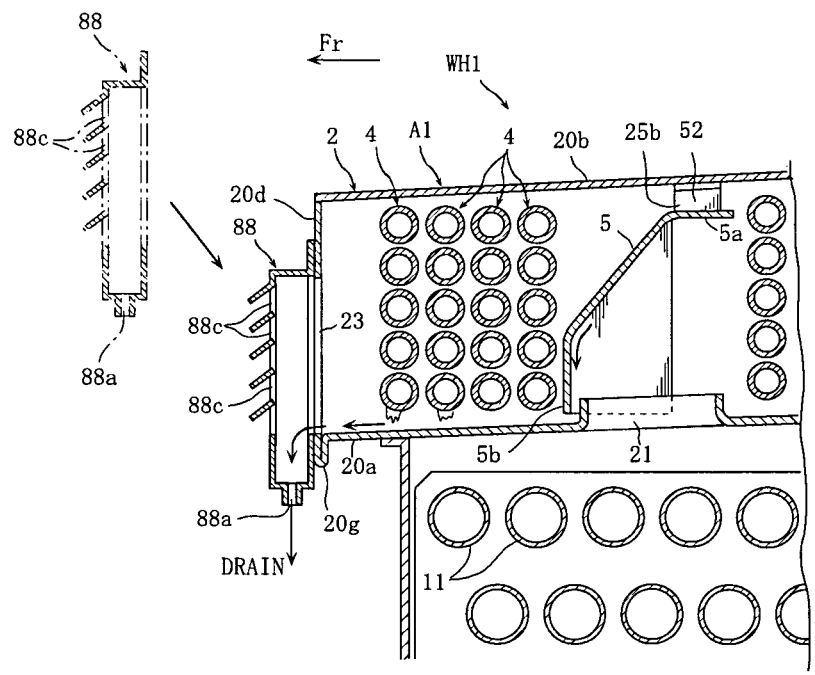
FIG. 5 is a sectional view illustrating a relevant portion of one exemplary arrangement in which the structure shown in FIG. 3 is provided with an exhaust terminal.

The water heater WH1 according to the present embodiment is formed as a hot water supplying apparatus. As better shown in FIG. 1, the water heater WH1 includes a combustor 3, a primary heat exchanger 1, and a secondary heat exchanger A1. The secondary heat exchanger A1 is one exemplary heat exchanger according to the present invention. In FIGS. 3 to 5, arrow Fr indicates the forward direction of the secondary heat exchanger A1 and water heater WH1.

The combustor 3, which is a gas burner for example, is accommodated in a burner case 30 and serves to burn fuel gas supplied from outside through piping 32. A fan 31 feeds air for combustion air upwardly into the burner case 30. The primary heat exchanger 1 serves to recover sensible heat from combustion gas generated by the combustor 3 and has a structure in which a plurality of heat transfer tubes 11 having a plurality of fins 12 for example are arranged in a case 10.

The secondary heat exchanger A1 serves to recover latent heat from the combustion gas from which the sensible heat has been recovered by the primary heat exchanger 1 and is placed over an upper portion of the primary heat exchanger 1. The secondary heat exchanger A1 includes a plurality of heat transfer tubes 4, a case 2 accommodating these heat transfer tubes 4 therein, a guide member 5 located in the case 2, and a pair of headers 48 and 49 as a water inlet and a hot water outlet, respectively.

As illustrated in FIG. 4, the plurality of heat transfer tubes 4 are each a spiral tube shaped oval in plan view. Each heat transfer tube 4 is similar in basic structure to that described in Japanese Patent Laid-Open Publication No. 2008-298325 mentioned above. Specifically, each heat transfer tube 4 comprises a plurality of loop portions 40 which are continuous with each other and vertically stacked on each other to define a plurality of intervening gaps, each loop portion 40 having straight tube portions 40a and 40b extending transversely widthwise of the case 2 and curved tube portions 40c and 40d extending continuously with opposite ends of the straight tube portions 40a and 40b. The loop portions 40 of the respective heat transfer tubes 4 are formed to be different in size from each other and substantially concentrically lap-wound. Each heat transfer tube 4 has lower and upper ends which are continuous with respective extension tube portions 41 and 42 extending through one of opposite side wall portions 20e and 20f of the case 2. The headers 48 and 49 are fitted on the outer ends of the extension tube portions 41 and 42. As better shown in FIGS. 1 and 2, the header 49 has a hot water outlet 49a connected to a water inlet 11a of the heat transfer tubes 11 via appropriate piping 99. The header 48 has a water inlet 48a connected to a water supply tube (not shown). Water supplied from the water supply tube into the water inlet 48a is heated by passing through the plurality of heat transfer tubes 4 and 11 sequentially and then supplied to a desired hot water destination through the hot water outlet 11b.

The case 2, which is in the form of a hollow rectangular parallelepiped, has a bottom wall portion 20a, an upper wall portion 20b, a rear wall portion 20c and a front wall portion 20d as shown in FIG. 3, in addition to the aforementioned pair of side wall portions 20e and 20f. These wall portions surround the plurality of heat transfer tubes 4. Of the wall portions, the bottom wall portion 20a, upper wall portion 20b and rear wall portion 20c are specific equivalents of the first to third wall portions of the case defined by the present invention. The bottom wall portion 20a is formed with an intake vent 21 for allowing combustion gas having proceeded upwardly in the primary heat exchanger 1 to flow into a central space defined by the heat transfer tube 4 of the innermost circumference. As shown in FIG. 4, the intake vent 21 is shaped oval or rectangular in plan view like the heat transfer tube 4 of the innermost circumference. The intake vent 21 has a peripheral edge portion formed with an upwardly erected wall 22. In cases where drain produced at the time of latent heat recovery from the combustion gas drops from the heat transfer tubes 4 onto the bottom wall portion 20a, the erected wall 22 is helpful in preventing the drain from flowing into the intake vent 21.

Figure 2:
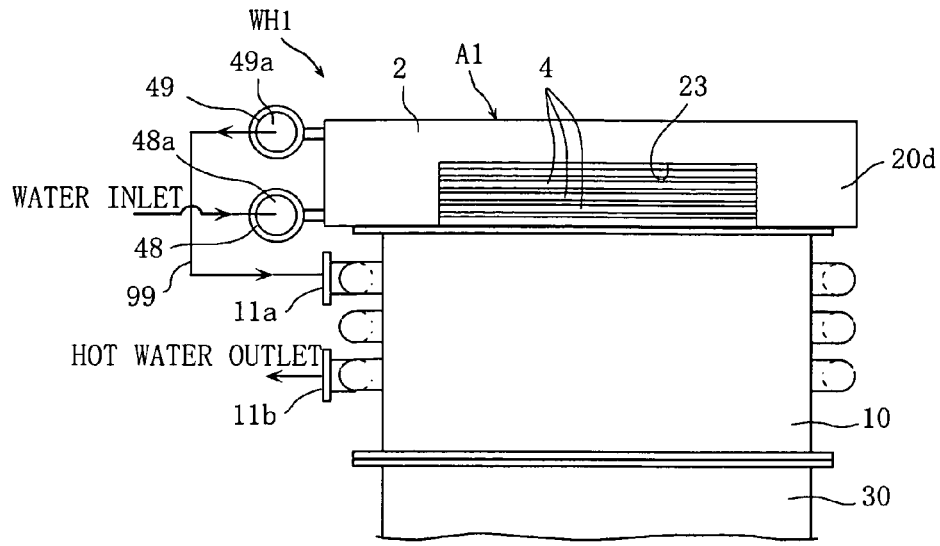
FIG. 2 is a front elevational view illustrating a relevant portion of the water heater illustrated in FIG. 1.

The front wall portion 20d of the case 2 is formed with an exhaust vent 23 for exhausting the combustion gas finished with heat recovery to outside the case 2. The exhaust vent 23, which is shaped rectangular in front view as shown in FIG. 2 for example, is formed on the lower side of the front wall portion 20d and has a lower edge portion defined by the bottom wall portion 20a. The bottom wall portion 20a is inclined downwardly as it extends toward the front to cause drain thereon to flow toward the exhaust vent 23.

As shown in FIG. 5, an exhaust terminal 88 is fitted on a front surface of the case 2. The exhaust terminal 88 has an opening 88c for allowing exhaust gas passing through the exhaust vent 23 to flow out of the case 2 or a connection port (not shown) for connection to a duct (not shown) designed to guide the exhaust gas to a desired point. The exhaust terminal 88 also has a drain outlet 88a for discharging drain flowing thereinto. The exhaust vent 23 of the case 2 is positioned so as to allow drain reaching the front end of the bottom wall portion 20a to flow into the exhaust terminal 88. Therefore, drain dropped from each heat transfer tube 4 onto the bottom wall portion 20a flows into the exhaust terminal 88 through the exhaust vent 23 and is then discharged to outside through the drain outlet 88a. The bottom wall portion 20a of the case 2 may be individually provided with a drain outlet 88b as shown in FIGS. 9 and 10 for example. However, the arrangement for causing drain inside the case 2 to flow into the exhaust terminal 88 according to the present embodiment makes it possible to eliminate the drain outlet 88b.

The bottom wall portion 20a has a front edge portion 20g folded into two plies and pressed into a flat U-shaped portion as a press-worked portion as shown in FIG. 5 (not shown in any other drawing). The exhaust terminal 88 is fixed to the front wall portion 20d by means of a screw for example and is also fixed to the front edge portion 20g by means of a screw. Preferably, a seal member (not shown) is sandwiched between the exhaust terminal 88 and the front edge portion 20g. Because the front edge portion 20g has a high rigidity, the exhaust terminal 88 can be firmly secured thereto.

In FIGS. 3 and 4, that portion of the internal space of the case 2 which is located closer to the rear than the region formed with the intake vent 21 is a first space region 24A, while that portion of the internal space of the case 2 which is located closer to the front than the region formed with the intake vent 21 is a second space region 24B. That portion of the first space region 24A which extends between the uppermost tube portions 40a' of the heat transfer tubes 4 and the upper wall portion 20b forms a first gap 25a.

The guide member 5 is a member for guiding combustion gas entering the case 2 through the intake vent 21 to the first space region 24A and is formed using sheet metal such as stainless steel sheet or the like. The guide member 5 is fixedly suspended downwardly from the upper wall portion 20b by means of a pair of support members 52 for example. The guide member 5 includes a main body portion 50 extending from above a region immediately above the intake vent 21 to the front side of that region, and a pair of side plate portions 51 formed on the longitudinally opposite sides of the main body portion 50 (i.e., widthwise opposite sides in FIGS. 1 and 4). The guide member 5 has an upper portion 5a which is shaped into a substantially horizontally extending plate fitted with the support members 52. As better shown in FIGS. 1 and 3, the upper portion 5a is spaced apart from the upper wall portion 20b to define a second gap 25b therebetween. The first and second gaps 25a and 25b communicate with each other. Thus, after having proceeded into the first space region 24A, the combustion gas can proceed in the forward direction by passing through the first and second gaps 25a and 25b as indicated by arrow N3'.

The upper portion 5a of the guide member 5 is positioned as high as or lower than the upper surfaces of the uppermost tube portions 40a' of the heat transfer tubes 4 and closely faces those tube portions 40a' which lie in the first space region 24A. This inhibits the combustion gas impinging upon the guide member 5 through the intake vent 21 from flowing directly into the first and second gaps 25a and 25b. Though the upper portion 5a of the guide member 5 is spaced apart from the uppermost tube portions 40a' according to the present embodiment, the upper portion 5a may be brought into contact with the tube portions 40a'. In this case, heat received by the guide member 5 from the combustion gas can be transferred to the tube portions 40a'.

That portion of the first space region 24A which extends between the lowermost tube portions 40a" of the heat transfer tubes 4 and the bottom wall portion 20a forms a third gap 25c. The guide member 5 is positioned so as not to form a partition between the third gap 25c and the intake vent 21. Thus, part of combustion gas entering the case 2 through the intake vent 21 is allowed to flow directly into the third gap 25c as indicated by arrow N1'.

The guide member 5 has a sloped portion 5c inclined forwardly downwardly from one end of the upper portion 5a. In the second space region 24B, part of the heat transfer tubes 4 forms a neighbor portion 47 which faces and neighbors the guide member 5. The sloped portion 5c is helpful in causing the combustion gas to act on the neighbor portion 47 efficiently. The guide member 5 has a lower portion 5b positioned above the bottom wall portion 20a. The lower portion 5b and the bottom wall portion 20a define therebetween a fourth gap 25d which allows drain present on the bottom wall portion 20a to pass therethrough. The lower portion 5b of the guide member 5 is positioned forwardly or outwardly laterally of the erected wall 22 so as not contact the erected wall 22. The lower portion 5b of the guide member 5 and the erected wall 22 overlap each other in the horizontal direction.

The guide member 5 is located inwardly of the heat transfer tube 4 of the innermost circumference. As shown in FIG. 4, the combustion gas can pass between the guide member 5 and the pair of side wall portions 20e and 20f in the directions indicated by arrow N3 from the first space region 24A toward the second space region 24B. The pair of side plate portions 51 of the guide member 5 (see FIG. 1) exhibit a flow restricting action to inhibit the combustion gas entering the case 2 through the intake vent 21 from proceeding at a very wide angle toward the side wall portions 20e and 20f while serving to reduce noise (i.e., windage noise of combustion gas) within the case 2.

Description will be made of the operation of the water heater WH1.

Initially, as the combustor 3 is driven to generate combustion gas, the combustion gas is subjected to sensible heat recovery by the primary heat exchanger 1 and then allowed to flow into the case 2 through the intake vent 21 of the secondary heat exchanger A1. The combustion gas thus introduced is caused to proceed into the first space region 24A by guiding action of the guide member 5 as indicated by arrow N1. Therefore, heat recovery from the combustion gas is made by utilizing those portions of the heat transfer tubes 4 which lie in the first space region 24A. Part of the combustion gas passes through the third gap 25c as indicated by arrow N1' in FIG. 3 to act on the lowermost tube portions 40a". For this reason, the lowermost tube portions 40a" are also effectively utilized in heat recovery.

After having reached the first space region 24A, the combustion gas impinges upon the rear wall portion 20c as indicated by arrow N2, proceeds toward the front side of the case 2 and then flows into the second space region 24B. In this case, a flow of combustion gas passing through the first and second gaps 25a and 25b as indicated by arrow N3' in FIG. 3 is generated in addition to flows of combustion gas passing the opposite lateral sides of the guide member 5 as indicated by arrow N3 in FIG. 4. Therefore, the combustion gas is caused to efficiently act on the uppermost tube portions 40a' fronting on the first gap 25a, so that heat recovery effectively utilizing the tube portions 40a' is also performed.

Though the guide member 5 is heated by the combustion gas to elevated temperatures, the amount of heat transferred from the guide member 5 to the upper wall portion 20b is relatively small because the upper portion 5a of the guide member 5 is attached to the upper wall portion 20b of the case 2 via the intervening support members 52 and defines the second gap 25b therebetween. As a result, there arises no problem that the upper wall portion 20b is heated to abnormally high temperatures by heat transfer from the guide member 5.

The combustion gas having passed through the first and second gaps 25a and 25b partially descends along the sloped portion 5c of the guide member 5 as indicated by arrow N3" in FIG. 3 and effectively acts on the neighbor portion 47 of the heat transfer tubes 4 and a portion therearound. Therefore, the combustion gas is caused to effectively act on substantially the entire region of those portions of the heat transfer tubes 4 which lie in the second space region 24B, thus resulting in an increased rate of heat recovery from the combustion gas. Therefore, it is possible to increase the heat exchange efficiency of the secondary heat exchanger A1. The combustion gas having flowed into the second space region 24B is exhausted out of the case 2 through the exhaust vent 23.

As already described, the erected wall 22 formed on the peripheral edge portion of the intake vent 21 is helpful in preventing drain dropped onto the bottom wall portion 20a of the case 2 from flowing into the intake vent 21. Since the lower portion 5b of the guide member 5 and the bottom wall portion 20a define the fourth gap 25d therebetween, the guide member 5 fails to improperly dam up the flow of drain along the bottom wall portion 20a thereby to allow the drain to smoothly proceed toward the drain outlet 88a shown in FIG. 5.

In FIG. 3, there may be cases where drain adheres to side surfaces 5d of the guide member 5 and flows down along the side surfaces 5d as indicated by arrow n1. However, since the lower portion 5b is outwardly spaced apart from the erected wall 22, the drain fails to flow from the lower portion 5b onto the top or internal surface of the erected wall 22 and hence can be prevented from flowing into the intake vent 21. The drain having reached the lower portion 5b of the guide member 5 drops onto the bottom wall portion 20a, passes through the fourth gap 25d and then flows toward the front side of the case 2 smoothly. Since the erected wall 22 and the lower portion 5b of the guide member 5 overlap each other in the horizontal direction, a phenomenon is not likely that a large proportion of the combustion gas entering the case 2 through the intake vent 21 proceeds directly toward the second space region 24B by passing through the fourth gap 25d. Therefore, it is also possible to obtain the effect of causing the combustion gas to proceed from the intake vent 21 toward the first space region 24A efficiently.

In the present embodiment, the guide member 5 is positioned in the central space defined by the heat transfer tubes 4 each shaped oval in plan view. Conventionally, such a central space defined by the heat transfer tubes 4 is a dead space. The guide member 5 is placed within the case 2 with a high space efficiency by effectively utilizing such a dead space. This is preferable in reducing the size of the entire secondary heat exchanger A1. As already described, the primary heat exchanger 1 and the secondary heat exchanger A1 are joined together by vertically stacking their respective cases 10 and 2 directly on each other. Further, the present embodiment is arranged to cause the combustion gas having been subjected to heat recovery by the primary heat exchanger 1 to flow from the case 10 directly into the guide member 5. For this reason, the total height of the two heat exchangers 1 and A1 can be reduced. In addition, there is no need to provide an additional member dedicated to guide the combustion gas from the primary heat exchanger 1 to the secondary heat exchanger A1. As a result, the overall structure of the water heater WH1 can be simplified.

FIGS. 6 to 13 illustrate other embodiments of the present invention. In these figures, parts identical with or similar to the corresponding parts of the foregoing embodiment are designated by like reference characters.

Figure 6:
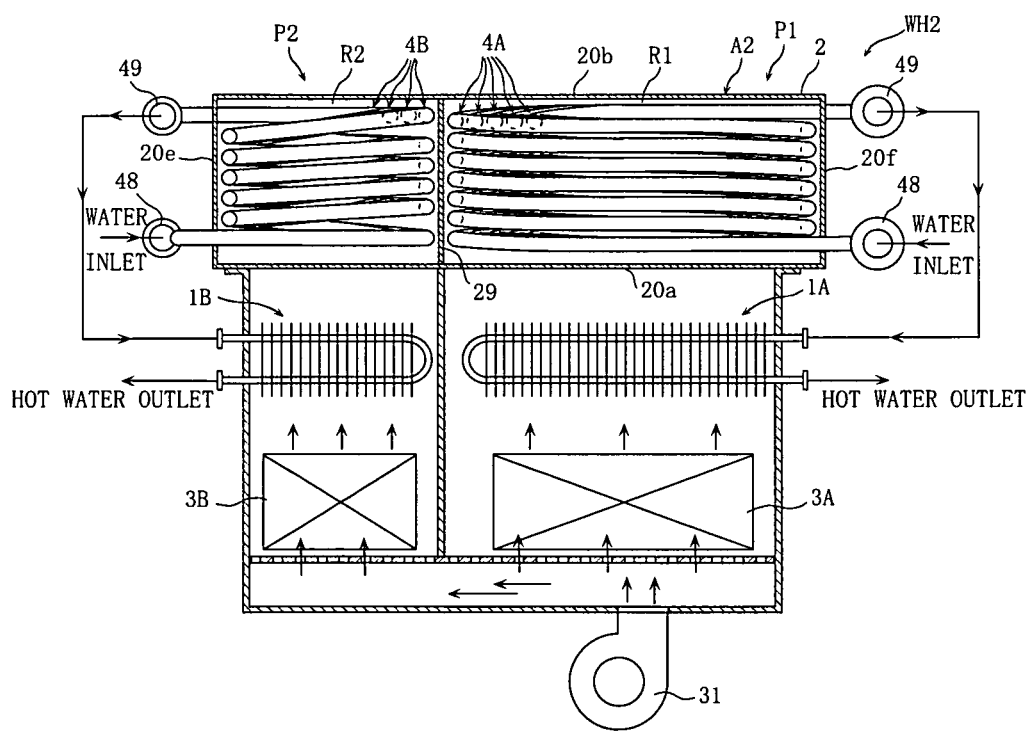
FIG. 6 is a sectional front elevational view schematically illustrating another example according to the present invention.

A water heater WH2 illustrated in FIG. 6 includes a pair of combustors 3A and 3B, a pair of primary heat exchangers 1A and 1B, and a secondary heat exchanger A2. The case 2 of the secondary heat exchanger A2 is partitioned by a partition wall 29 into two chambers R1 and R2 arranged side by side which accommodate therein a plurality of heat transfer tubes 4A and a plurality of heat transfer tubes 4B, respectively. The fan 31, combustor 3A, primary heat exchanger 1A and heat transfer tubes 4A form a first hot water generating section P1 configured to heat water for general hot water supply. The first hot water generating section P1 is similar in basic structure to the foregoing water heater WH1 except some details including the difference in orientation between the heat transfer tubes 4 and 4A. For this reason, redundant description will be omitted.

Figure 7:
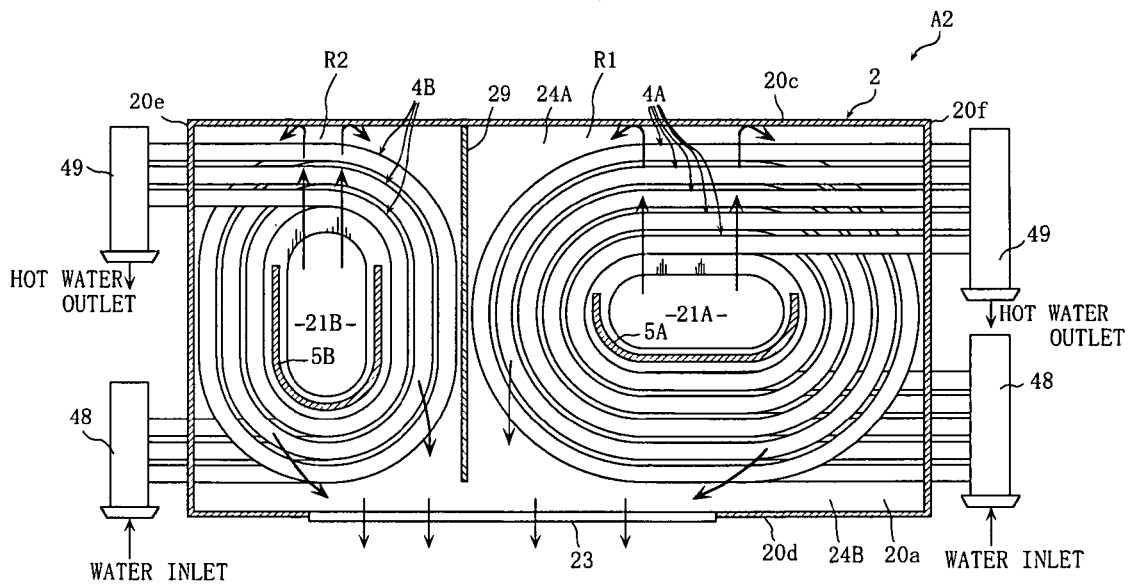
FIG. 7 is a sectional plan view illustrating a relevant portion of the example illustrated in FIG. 6.

The combustor 3B, primary heat exchanger 1B and heat transfer tubes 4B (which is an exemplary equivalent of the "additional heat transfer tube" defined by the present invention) form a second hot water generating section P2 configured to heat water for floor heating for example. The second hot water generating section P2, which is similar in basic structure to the first hot water generating section P1, is capable of heating water (including antifreeze) passing through the primary heat exchanger 1B and the heat transfer tubes 4B by recovering sensible heat and latent heat sequentially from combustion gas generated from the combustor 3B by the primary heat exchanger 1B and the heat transfer tubes 4B. As shown in FIG. 7, the longitudinal axis of the heat transfer tubes 4A extends in the transversely widthwise direction of the case 2, whereas the longitudinal axis of the heat transfer tubes 4B extends in the depthwise (front-back) direction of the case 2 shown. With this arrangement, the case 2 can have a reduced size by reducing the total width of the heat transfer tubes 4A and 4B, as compared with an arrangement in which the heat transfer tubes 4A and 4B are positioned so that their respective longitudinal axes extend in the widthwise direction of the case 2.

The bottom wall portion 20a of the case 2 is provided with intake vents 21A and 21B formed in regions thereof coinciding with central spaces defined by the heat transfer tubes 4A and 4B. Guide members 5A and 5B are provided in association with the respective intake vents 21A and 21B. The intake vent 21A has an oval or rectangular shape having a longitudinal axis extending in the widthwise direction of the case 2, whereas the intake vent 21B (which is an exemplary equivalent of the "additional intake vent" defined by the present invention) has an oval or rectangular shape having a longitudinal axis extending in the depthwise direction of the case 2. The guide members 5A and 5B are tailored to the respective intake vents 21A and 21B and configured to cause combustion gas entering the case 2 through the intake vents 21A and 21B to proceed toward the rear side of the case 2 while inhibiting the flow of combustion gas from widening in the widthwise direction of the case 2 as far as possible.

According to the present embodiment, it is possible to cause the combustion gas entering the case 2 through the intake vent 21A to proceed toward the exhaust vent 23 within the case 2 along a path similar to that in the secondary heat exchanger A1 of the foregoing embodiment. It is also possible to guide the combustion gas entering the case 2 through the intake vent 21B to the exhaust vent 23 by causing the combustion gas to proceed toward the rear side within the case 2 by the guiding action of the guide member 5B and then proceed toward the front side. The combustion gas thus proceeding can act on substantially the entire heat transfer tubes 4B efficiently.

As can be understood from the present embodiment, when ovally spiral tubes are used as the heat transfer tubes according to the present invention, the combustion gas may be caused to proceed either in the transverse direction or the longitudinal direction of the heat transfer tubes by the guide member. The heat exchanger according to the present invention may comprise plural sets of heat transfer tubes accommodated in a single case.

Figure 8:
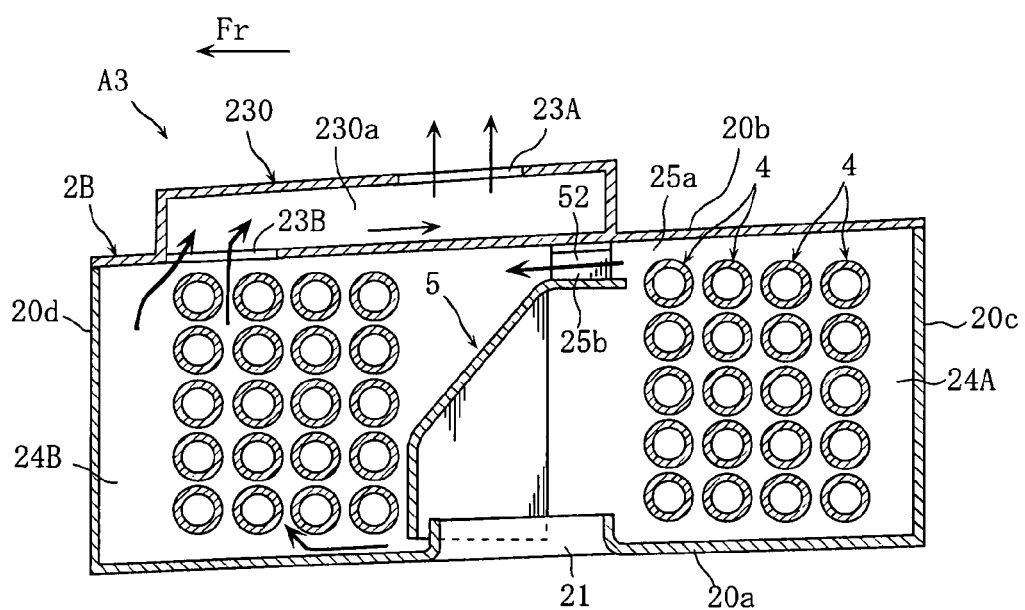
FIG. 8 is a sectional side elevational view illustrating another example according to the present invention.

A heat exchanger A3 illustrated in FIG. 8 is provided with an auxiliary section 230 on the upper wall portion 20b of a case 2B, the auxiliary section 230 defining an exhaust vent 23A and an exhaust gas passage 230a. The upper wall portion 20b is formed with an opening 23B which provides communication between the second space region 24B of the case 2B and the exhaust gas passage 230a. In the present embodiment, combustion gas (exhaust gas) that has been finished with heat recovery by proceeding from the first space region 24A to the second space region 24B within the case 2B reaches the exhaust vent 23A by passing through the opening 23B and the exhaust gas passage 230a and is exhausted out of the case 2B through the exhaust vent 23A. As can be understood from the present embodiment, the exhaust vent need not necessarily be formed at the front wall portion of the case as long as the exhaust vent is formed so as to be in communication with the second space region 24B.

Figure 9A:
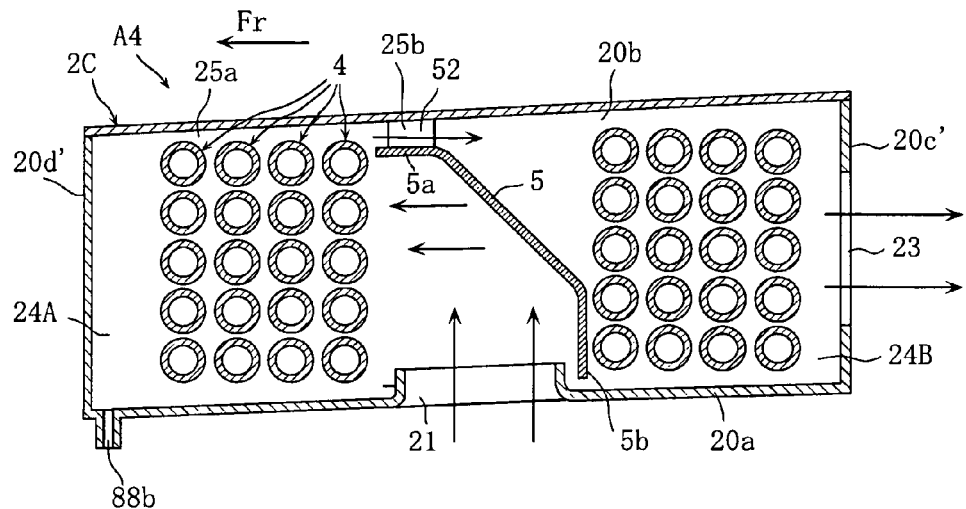
FIG. 9A is a sectional side elevational view illustrating another example according to the present invention and FIG. 9B is a partially sectional side elevational view illustrating an example in which the heat exchanger shown in FIG. 9A is accommodated in an outer case.
Figure 10:
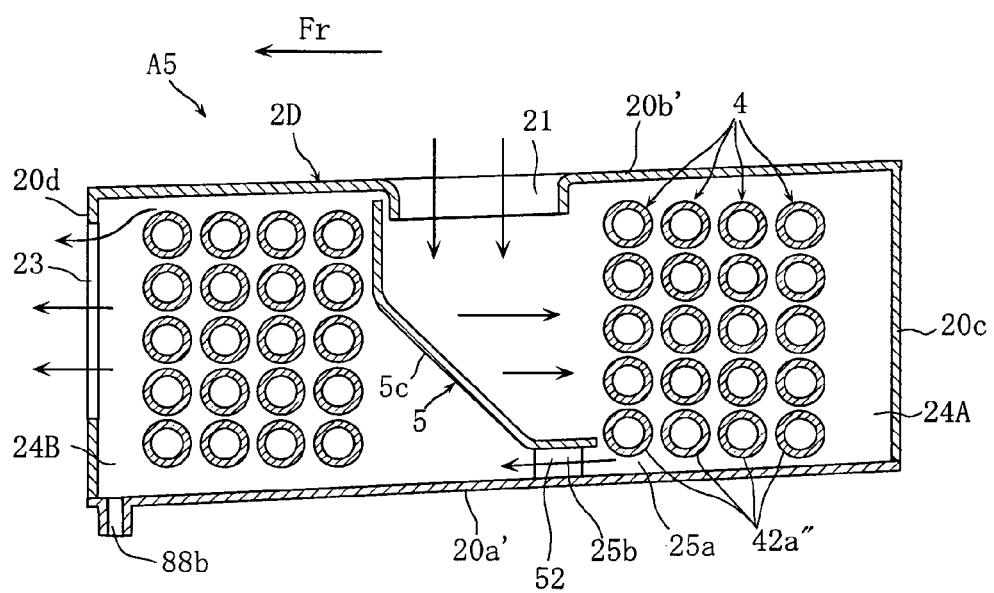
FIG. 10 is a sectional side elevational view illustrating another example according to the present invention.

In a heat exchanger A4 illustrated in FIG. 9A, the exhaust vent 23 is not formed at a front wall portion 20d' of a case 2C but is formed at a rear wall portion 20c'. The guide member 5 is positioned to cause combustion gas entering the case 2C through the intake vent 21 to proceed in the forward direction Fr. That portion of the internal space of the case 2C which is located closer to the front than the region formed with the intake vent 21 is the first space region 24A, while that portion of the internal space of the case 2C which is located closer to the rear than that region is the second space region 24B. The front wall portion 20d' of the present embodiment is equivalent to the "third wall portion" defined by the present invention.

Figure 9B:
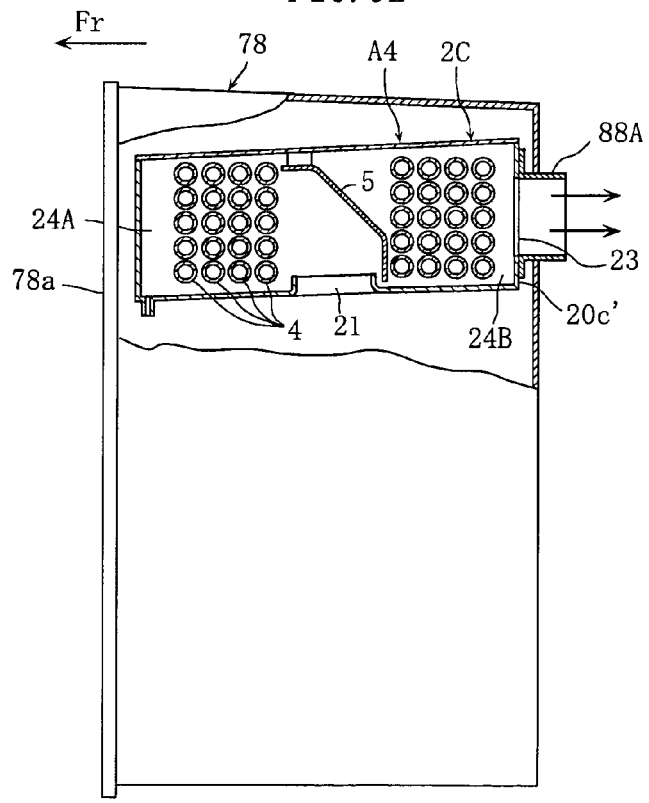

As shown in FIG. 9B, the heat exchanger A4 is accommodated in an outer case 78 which is provided with an openable door 78a on the front side thereof for example. This embodiment employs an arrangement in which an exhaust terminal 88A is mounted on the rear wall portion 20c' of the case 2C and partially exposed to outside the outer case 78 in order to properly discharge exhaust gas out of the outer case 78. As can be understood from the present embodiment, the present invention may have an arrangement in which the exhaust vent is provided on the rear side of the case and does not necessarily require that the first and second space regions defined by the present invention be located on the rear side and the front side, respectively, within the case.

In a heat exchanger A5 illustrated in FIG. 10, the intake vent 21 is formed at an upper wall portion 20b' of a case 2D and the arrangement of the intake vent 21 and the guide member 5 is similar to a vertically inverted arrangement relative to, for example, the arrangement of the intake vent 21 and the guide member 5 in the foregoing heat exchanger A1. Therefore, in the present embodiment the upper wall portion 20b' of the case 2D is equivalent to the "first wall portion" defined by the present invention, while a bottom wall portion 20a' equivalent to the "second wall portion" defined by the present invention. The first gap 25a is defined between lowermost tube portions 42a" of the heat transfer tubes 4 and the bottom wall portion 20a', while the second gap 25b defined between the lower portion of the guide member 5 and the bottom wall portion 20a'. Though the present embodiment is different from the foregoing heat exchanger A1 in that the combustion gas flow is vertically inverted, the present embodiment can obtain a heat recovery effect similar to that of the heat exchanger A1 and can likewise exhibit an enhanced heat exchange efficiency by causing combustion gas to act on substantially the entire heat transfer tubes 4. Drain dropped from the heat transfer tubes 4 onto the bottom wall portion 20a' can be properly discharged out of the case 2D through a drain outlet 88b for example by being caused to flow along the bottom wall portion 20a' smoothly. As can be understood from the present embodiment, the present invention may have an arrangement in which any wall portion of the case other than the bottom wall portion is formed with the intake vent and hence is used as the "first wall portion" defined by the present invention.

Figure 11:
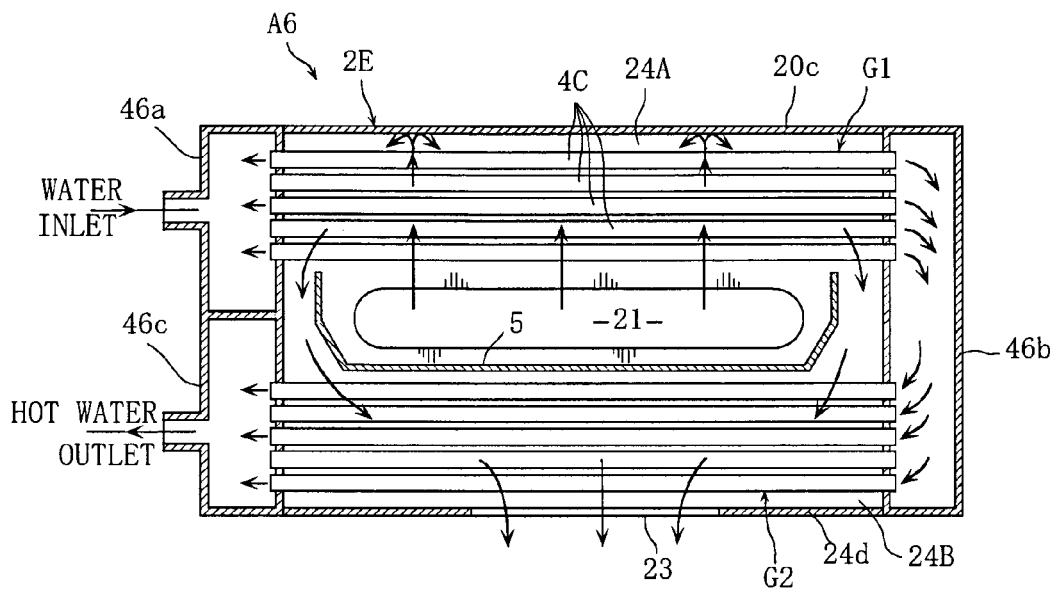
FIG. 11 is a sectional plan view illustrating another example according to the present invention.

In a heat exchanger A6 illustrated in FIG. 11, a plurality of heat transfer tubes 4C are each formed using a straight tube. The plurality of heat transfer tubes 4C are divided into first and second groups G1 and G2 which are located in the first and second space regions 24A and 24B, respectively, within a case 2E in such a manner that the groups G1 and G2 are opposed to each other across the region formed with the intake vent 21. One end of the first group G1 is provided with a water inlet head 46a. After water supplied to the water inlet head 46a has passed through the heat transfer tubes 4C of the first group G1, the water passes through an auxiliary head 46b and then passes through the heat transfer tubes 4C of the second group G2 to reach a water outlet head 46c. After combustion gas entering the case 2E through the intake vent 21 has proceeded to the first space region 24A by the guiding action of the guide member 5, the combustion gas is caused to proceed toward the second space region 24B and is exhausted through the exhaust vent 23. Thus, the combustion gas acts on the entire region of the plurality of heat transfer tubes 4C efficiently.

Figure 12:
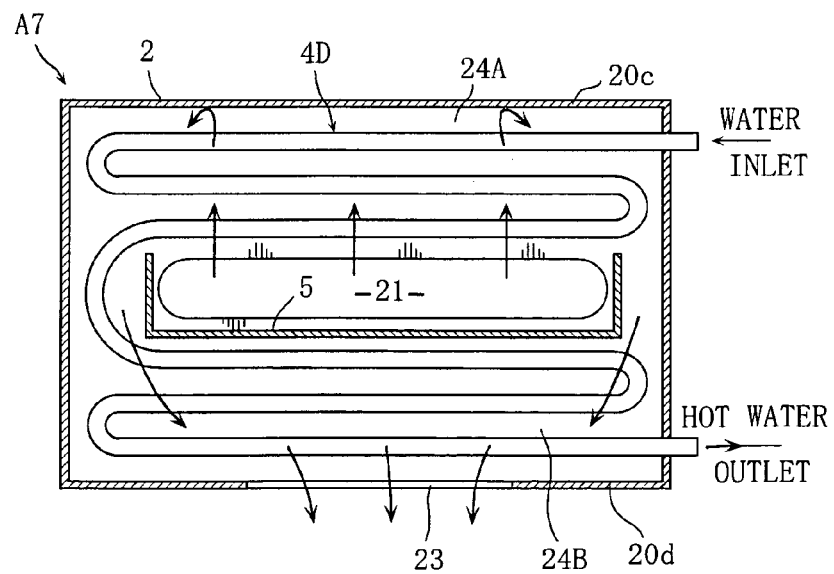
FIG. 12 is a sectional plan view illustrating another example according to the present invention.

In a heat exchanger A7 illustrated in FIG. 12, heat transfer tubes 4D are each formed using a tube having a meandering shape in plan view. Each of the heat transfer tubes 4D may be formed using a flexible tube. Part of the heat transfer tubes 4D is positioned in the first space region 24A located closer to the rear of the case 2 than the region formed with the intake vent 21, while other part of the heat transfer tubes 4D positioned in the second space region 24B located closer to the front of the case 2 than the region formed with the intake vent 21. This arrangement can also cause combustion gas entering the case 2 through the intake vent 21 to act on the entire region of the heat transfer tubes 4D efficiently. As can be understood from the present embodiment and the embodiment illustrated in FIG. 11, the heat transfer tubes according to the present invention may be formed using tubes other than spiral tubes.

Figure 13:
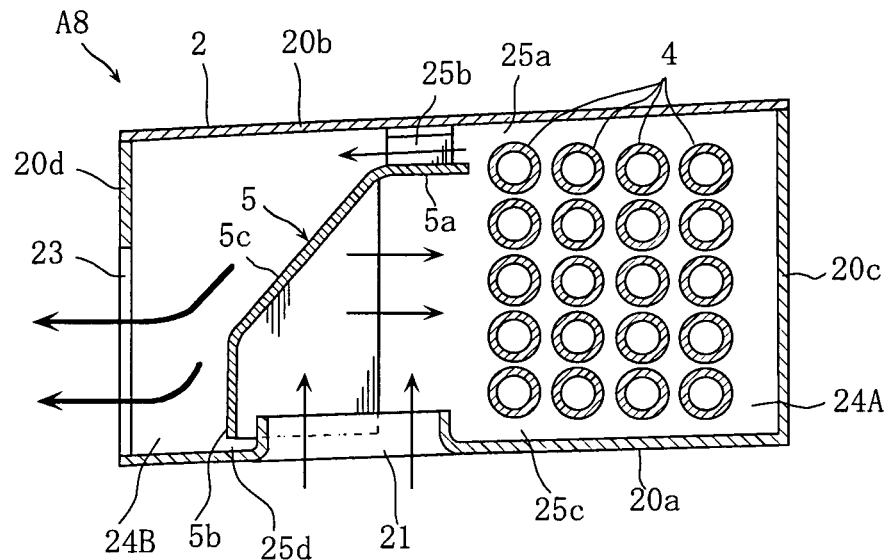
FIG. 13 is a sectional side elevational view illustrating another example according to the present invention.
Figure 14:
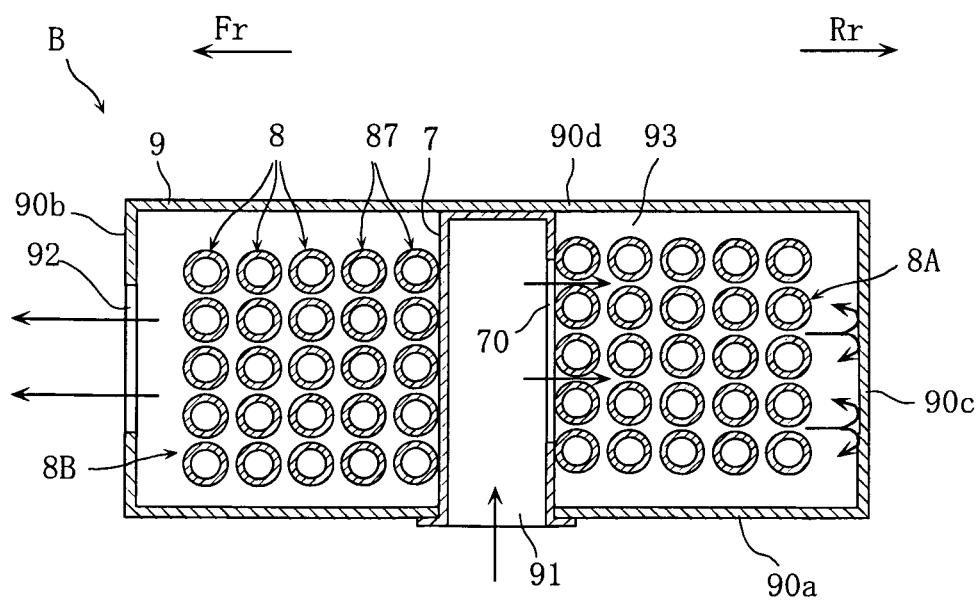
FIG. 14 is a sectional side elevational view illustrating one example according to the conventional art.

In a heat exchanger A8 illustrated in FIG. 13, the plurality of heat transfer tubes 4 are located only in the first space region 24A located closer to the rear than the region formed with the intake vent 21, with no heat transfer tube in the second space region 24B. This arrangement is capable of causing combustion gas to act on all the portions of the heat transfer tubes 4 in the first space region 24A, though incapable of performing heat recovery utilizing heat transfer tubes in the second space region 24B. This arrangement can also obtain the intended effects of the present invention including inhibiting heat transfer from the guide member 5 to the upper wall portion 20b of the case 2 thereby inhibiting the upper wall portion 20b from being heated to elevated temperatures. For this reason, the present embodiment is also included within the technical scope of the present invention.

In the present embodiment, the guide member 5 intervenes between the exhaust vent 23 and the plurality of heat transfer tubes 4. For this reason, the guide member 5 can exercise the effect of functioning as a sound barrier. More specifically, noise (windage noise) occurs as combustion gas enters the case 2 and passes through different portions in the case 2, resulting in leakage of the noise to outside. The guide member 5, which is located to face the exhaust vent 23 closely, can functions as the sound barrier to reduce the leakage of noise to outside.

The present invention is not limited to the foregoing embodiments. Specific features of different parts of the heat exchangers and water heaters according to the present invention may be variously changed in design.

Figure 1:
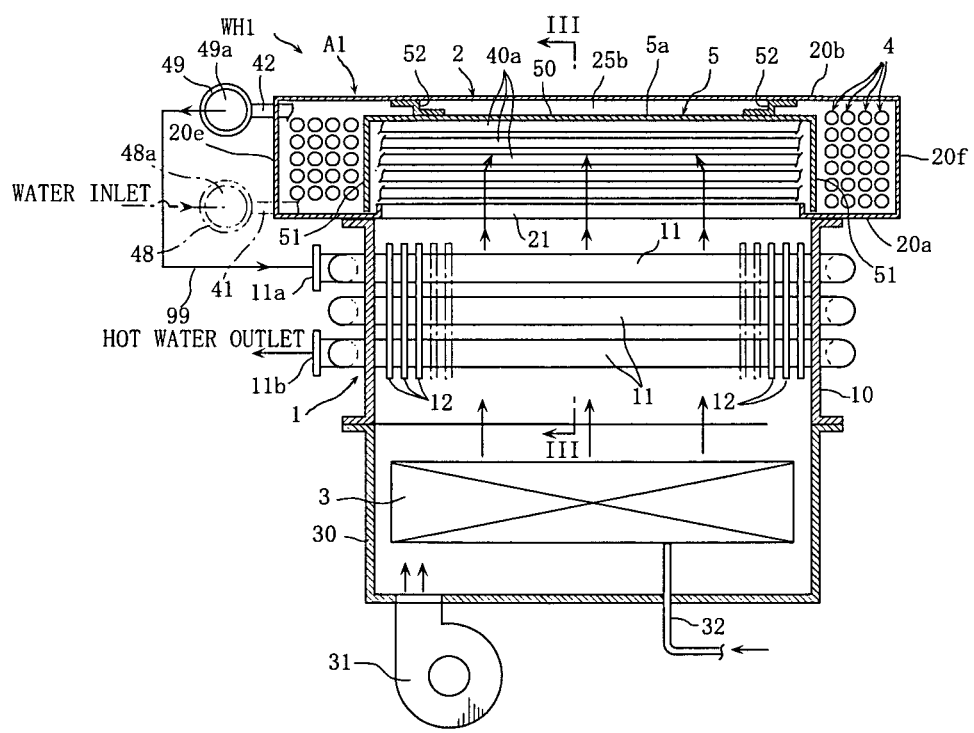
FIG. 1 is a sectional front elevational view schematically illustrating one exemplary water heater incorporating a heat exchanger according to the present invention.

The "guide member" defined by the present invention may not have the pair of side plate portions 51 shown in FIG. 1 or the sloped portion 5c shown in FIG. 3. The guide member may be mounted, for example, in such a manner as to be erected from the erected wall instead of being supported as suspended from the upper wall portion of the case. Alternatively, the guide member may be mounted and supported on the heat transfer tubes. It is sufficient that the case simply has the plurality of wall portions surrounding the heat transfer tubes, and the intake vent and the exhaust vent for taking in and exhausting the heating gas. There is no limitation on the specific shape, size and material of the case. Any one of the first to third wall portions of the case defined by the present invention is not limited to any one of the bottom wall portion, upper wall portion and rear wall portion, as already described in relation to the embodiments illustrated in FIGS. 9 and 10.

In any one of the foregoing embodiments, the heat exchanger according to the present invention is used as the secondary heat exchanger for latent heat recovery. The present invention is not limited to this arrangement, either. For example, the heat exchanger may be configured to recover sensible heat or both of sensible heat and latent heat from combustion gas generated by the combustor. The "water heater" defined by the present invention is meant by an apparatus having a hot water generating function and is a broad concept including various types of water heater for general hot water supply, hot water supply to bath, hot water supply for heating or snow melting, and for other hot water supply purposes, and apparatuses for generating hot water to be used for purposes other than the hot water supply purposes. Examples of usable heating gases include, in addition to combustion gas, exhaust gases produced by gas engines for cogeneration and exhaust gases produced by fuel cells.

What is claimed is:

1. A heat exchanger comprising:
   a heat transfer tube for heat exchange, the heat transfer tube being a spiral tube shaped oval in plan view and being constituted with a plurality of loop portions which are continuous with each other and vertically stacked on each other;
   a case having a plurality of wall portions surrounding the heat transfer tube and formed with an intake vent and an exhaust vent for taking in and exhausting heating gas, the plurality of wall portions including a first wall portion formed with the intake vent so as to communicate with space regions surrounded with the plurality of loop portions of the heat transfer tube, a second wall portion opposed to the first wall portion across the heat transfer tube and defining a first gap between the second wall portion and the heat transfer tube, and a third wall portion interconnecting the first and second wall portions, the case defining therein a first space region which is located closer to the third wall portion than a region formed with the intake vent and which accommodates therein at least part of the heat transfer tube, and a second space region which is located on a side opposed to the first space region across the region formed with the intake vent and which is in communication with the exhaust vent; and
   a guide member having a main body located closer to the second space region than the intake vent, the upper portion of the main body being located directly above the intake vent, wherein the guide member guides heating gas entering the case through the intake vent so as to be inhibited from directly proceeding into the second space region by the main body and to proceed toward the first space region, thereby the proceeding direction of the heating gas is reversed and the heating gas proceeds toward the second space region,
   the upper portion of the guide member, together with the second wall portion, defining therebetween a second gap in communication with the first gap for allowing part of the heating gas having been guided to the first space region to proceed into the second space region through the first and second gaps.

2. The heat exchanger according to claim 1, wherein:
   in the first space region the heat transfer tube and the first wall portion define a third gap therebetween; and
   the guide member is positioned in such a manner as not to form a partition between the intake vent and the third gap, to allow part of the heating gas entering the case through the intake vent to proceed toward the third gap.

3. The heat exchanger according to claim 1, wherein:
   the heat transfer tube extends over both of the first and second space regions and has a neighbor portion which faces and neighbors the guide member in the second space region; and
   the guide member has a sloped portion which is inclined in such manner that as the sloped portion extends away from the third wall portion, the sloped portion is spaced an increasing distance apart from the second wall portion and which causes part of the heating gas passing through the second gap from the first gap to proceed therealong toward the neighbor portion of the heat transfer tube.

4. The heat exchanger according to claim 1, wherein that portion of the guide member which faces the second wall portion across the second gap is opposed closely to or brought into contact with the heat transfer tube in the first space region in such a manner as to inhibit the heating gas impinging upon the guide member through the intake vent from partially flowing directly into the first and second gaps.

5. The heat exchanger according to claim 1, wherein:
   the first wall portion is a bottom wall portion which is located below the heat transfer tube and serves to receive drain dropped from the heat transfer tube; and
   the case is provided with drain discharging means for discharging the drain out of the case, while the bottom wall portion is inclined at least partially to cause the drain to flow toward the drain discharging means.

6. The heat exchanger according to claim 5, wherein:
   the first wall portion is the bottom wall portion;
   the intake vent has a peripheral edge portion formed with an erected wall for preventing the drain from flowing into the intake vent; and
   the guide member has a lower portion which, together with the bottom wall portion, defines a fourth gap therebetween for preventing the flow of the drain toward the drain discharging means from being dammed up by the lower portion of the guide member.

7. The heat exchanger according to claim 6, wherein the lower portion of the guide member is positioned to keep out of a region immediately above the intake vent and fail to contact the erected wall, whereby when drain adhering to the guide member flows downwardly along the guide member, the drain is prevented from flowing into the intake vent.

8. The heat exchanger according to claim 7, wherein the lower portion of the guide member and the erected wall overlap each other in a horizontal direction to inhibit the heating gas proceeding from the first space region toward the second space region from partially passing through a gap between the lower portion of the guide member and the erected wall.

9. The heat exchanger according to claim 5, wherein:
   the case further includes a fourth wall portion erected from the bottom wall portion and formed with the exhaust vent; and
   the fourth wall portion has an outer surface fitted with an exhaust terminal which guides exhaust combustion gas passing through the exhaust vent while defining a drain outlet for discharging drain flowing into the exhaust terminal to outside, whereby the drain dropped onto the bottom wall portion is allowed to flow into the exhaust terminal through the exhaust vent and then caused to be discharged to outside through the drain outlet.

10. The heat exchanger according to claim 9, wherein:
the bottom wall portion of the case has a portion forming a lower edge portion of the exhaust vent which is formed into a press-worked portion by being folded into plural plies and pressed flat; and
the exhaust terminal is fitted on the fourth wall portion by utilizing the press-worked portion.

11. The heat exchanger according to claim 1, further comprising a partition wall partitioning the case into a first chamber and a second chamber, wherein:
the intake vent is positioned to cause the heating gas to flow into the first chamber, while the heat transfer tube and the guide member are accommodated in the first chamber; and
the case is provided with an additional intake vent for allowing heating gas to flow into the second chamber, while the second chamber is provided with an additional heat transfer tube for heat recovery from the heating gas flowing into the second chamber.

12. The heat exchanger according to claim 1, wherein:
one of the first and second wall portions is a bottom wall portion and the other is an upper wall portion, while the third wall portion is a rear wall portion; and
the case further includes a fourth wall portion which is erected from the bottom wall portion and formed with the exhaust vent, the fourth wall portion being a front wall portion, the exhaust vent allowing the heating gas finished with heat recovery to be exhausted forwardly from the case therethrough.

13. The heat exchanger according to claim 1, wherein:
one of the first and second wall portions is a bottom wall portion and the other is an upper wall portion, while the third wall portion is a front wall portion; and
the case further includes a fourth wall portion which is erected from the bottom wall portion and formed with the exhaust vent, the fourth wall portion being a rear wall portion, the exhaust vent allowing the heating gas finished with heat recovery to be exhausted rearwardly from the case therethrough.

14. The heat exchanger according to claim 1, wherein the first wall portion and the second wall portion are a bottom wall portion and an upper wall portion, respectively, while the exhaust vent is located at the upper wall portion to allow the heating gas finished with heat recovery to be exhausted upwardly from the case therethrough.

15. The heat exchanger according to claim 1, wherein the first wall portion and the second wall portion are an upper wall portion and a bottom wall portion, respectively, while the intake vent is capable of being supplied with the heating gas from above the case.

16. The heat exchanger according to claim 1, wherein the heat transfer tube is one of an ovally spiral tube, a straight tube, and a meandering tube.

17. A water heater comprising:
a combustor that supplies heating gas; and
a heat exchanger configured to heat water by heat recovery from the heating gas, the heat exchanger comprising:
a heat transfer tube for heat exchange, the heat transfer tube being a spiral tube shaped oval in plan view and being constituted with a plurality of loop portions which are continuous with each other and vertically stacked on each other;
a case having a plurality of wall portions surrounding the heat transfer tube and formed with an intake vent and an exhaust vent for taking in and exhausting the heating gas, the plurality of wall portions including a first wall portion formed with the intake vent so as to communicate with space regions surrounded with the plurality of loop portions of the heat transfer tube, a second wall portion opposed to the first wall portion across the heat transfer tube and defining a first gap between the second wall portion and the heat transfer tube, and a third wall portion interconnecting the first and second wall portions, the case defining therein a first space region which is located closer to the third wall portion than a region formed with the intake vent and which accommodates therein at least part of the heat transfer tube, and a second space region which is located on a side opposed to the first space region across the region formed with the intake vent and which is in communication with the exhaust vent; and a
guide member having a main body located closer to the second space region than the intake vent, the upper portion of the main body being located directly above the intake vent, wherein the guide member guides heating gas entering the case through the intake vent so as to be inhibited from directly proceeding into the second space region by the main body and to proceed toward the first space region, thereby the proceeding direction of the heating gas is reversed and the heating gas proceeds toward the second space region,
the upper portion of the guide member, together with the second wall portion, defining therebetween a second gap in communication with the first gap for allowing part of the heating gas having been guided to the first space region to proceed into the second space region through the first and second gaps.

* * * * *